(12) United States Patent
Fu et al.

(10) Patent No.: US 12,408,035 B2
(45) Date of Patent: Sep. 2, 2025

(54) METHOD FOR SESSION CREATION AND RELATED EQUIPMENT

(71) Applicant: BEIJING UNISOC COMMUNICATIONS TECHNOLOGY CO., LTD., Beijing (CN)

(72) Inventors: Zhiwei Fu, Beijing (CN); Yifan Bai, Beijing (CN)

(73) Assignee: BEIJING UNISOC COMMUNICATIONS TECHNOLOGY CO., LTD., Beijing (CN)

(*) Notice: Subject to any disclaimer, the term of this patent is extended or adjusted under 35 U.S.C. 154(b) by 215 days.

(21) Appl. No.: 17/801,029

(22) PCT Filed: Apr. 26, 2020

(86) PCT No.: PCT/CN2020/087047
§ 371 (c)(1),
(2) Date: Aug. 19, 2022

(87) PCT Pub. No.: WO2021/164126
PCT Pub. Date: Aug. 26, 2021

(65) Prior Publication Data
US 2023/0098400 A1    Mar. 30, 2023

(30) Foreign Application Priority Data
Feb. 21, 2020    (CN) ......................... 202010110498.2

(51) Int. Cl.
H04W 12/069    (2021.01)
H04L 9/32    (2006.01)
(Continued)

(52) U.S. Cl.
CPC ......... *H04W 12/069* (2021.01); *H04L 9/3247* (2013.01); *H04L 9/3263* (2013.01);
(Continued)

(58) Field of Classification Search
CPC . H04W 12/069; H04W 12/065; H04W 12/72; H04W 76/11; H04W 12/37;
(Continued)

(56) References Cited

U.S. PATENT DOCUMENTS 10,193,698 B1 *   1/2019   Das ..................... G06F 21/33
10,291,613 B1 *   5/2019   Risso ................... H04L 63/083
(Continued)

FOREIGN PATENT DOCUMENTS

CN    103561006 A *   2/2014
CN    109286567 A    1/2019
(Continued)

OTHER PUBLICATIONS

Torroglosa-Garcia, Elena M., Jose M. Alcaraz Calero, Jorge Bernal Bernabe, and Antonio Skarmeta. "Enabling roaming across heterogeneous IoT wireless networks: LoRaWAN Meets 5G." IEEE Access 8 (2020): 103164-103180. (Year: 2020).*
(Continued)

*Primary Examiner* — Zhimei Zhu
(74) *Attorney, Agent, or Firm* — HAUPTMAN HAM, LLP (57) ABSTRACT

A method for session creation is provided. The method includes: reading from a secure unit application descriptors1 of a first application, where the application descriptors1 is bound to a signing certificate of the first application or a digital fingerprint of the signing certificate; and creating a session by using the application descriptors1 as application descriptors in a UE route selection policy (URSP) rule.

20 Claims, 5 Drawing Sheets

(51) Int. Cl.
  *H04L 9/40* (2022.01)
  *H04W 12/065* (2021.01)
  *H04W 12/37* (2021.01)
  *H04W 12/72* (2021.01)
  *H04W 76/11* (2018.01)
  *H04L 9/08* (2006.01)
  *H04L 67/141* (2022.01)
  *H04W 12/40* (2021.01)

(52) U.S. Cl.
  CPC ....... *H04L 63/0823* (2013.01); *H04W 12/065* (2021.01); *H04W 12/37* (2021.01); *H04W 12/72* (2021.01); *H04W 76/11* (2018.02); *H04L 9/0897* (2013.01); *H04L 67/141* (2013.01); *H04L 2209/80* (2013.01); *H04W 12/40* (2021.01)

(58) Field of Classification Search
  CPC .. H04W 12/40; H04W 8/183; H04L 2209/80; H04L 9/0897; H04L 9/3247; H04L 9/3263; H04L 63/0823; H04L 67/141; H04L 45/306
  See application file for complete search history.

(56) References Cited

U.S. PATENT DOCUMENTS

| | | | |
|---|---|---|---|
| 12,192,382 B2 * | 1/2025 | Fu | H04L 9/3268 |
| 2016/0277927 A1 * | 9/2016 | Lee | H04L 67/51 |
| 2020/0053622 A1 * | 2/2020 | Huang-Fu | H04W 76/20 |
| 2020/0126416 A1 * | 4/2020 | Montemurro | H04W 4/44 |
| 2023/0049987 A1 * | 2/2023 | Qiu | H04W 12/069 |

FOREIGN PATENT DOCUMENTS

| | | | | |
|---|---|---|---|---|
| CN | 110430590 A | | 11/2019 | |
| CN | 110474840 A | | 11/2019 | |
| CN | 110519753 A | * | 11/2019 | ........... H04L 9/3236 |
| CN | 110650475 A | | 1/2020 | |
| JP | 2006154997 A | | 6/2006 | |
| KR | 20200007754 A | | 1/2020 | |
| WO | 2019071134 A1 | | 4/2019 | |
| WO | WO-2020199105 A1 | * | 10/2020 | |

OTHER PUBLICATIONS

Greg Zaverucha, Dan Shumow, "Are Certificate Thumbprints Unique?", Feb. 2019, Real-World Cryptography (RWC) 2020 (Year: 2019).*
Huawei, HiSilicon , Discussion on Application Descriptor , 3GPP TSG SA WG2 #137e, S2-2002124, Feb. 18, 2020.
Motorola Mobility, Lenovo , Support of OSID and OSAppID as traffic descriptors based on stage 3 agreements, 3GPP TSG SA WG2 #137e, S2-2002303, Feb. 18, 2020.
The first office action issued in corresponding JP application No. 2022-550864 dated Aug. 3, 2023.
Notice of allowance issued in corresponding JP application No. 2022-550864 dated Nov. 15, 2023.
Motorola Mobility et al., S2-1901732, Support of ATSSS rules and URSP rules for MA-PDU Sessions, 3GPP TSG SA WG2 #131, 3GPP, Feb. 19, 2019.
Protection of Bioinformation, which is a Physical Trait, Oct. 10, 2013.
Signing Your Applications, Feb. 6, 2013.
The first office action issued in corresponding KR application No. 10-2022-4032240 dated Nov. 7, 2023.
The extended European search report issued in corresponding EP application No. 20920320.7 dated Jun. 30, 2023.
Huawei et al. 23.503: Clarification on URSP, SA WG2 Meeting#124, S2-178890, Dec. 1, 2017.
ZTE, Clarification on Policy Control Request Triggers, 3GPP TSG-SA WG2 Meeting#136, S2-1912205, Nov. 22, 2019.
The first office action issued in corresponding CN application No. 202010110498.2 dated Oct. 9, 2020.
Notice of allowance issued in corresponding CN application No. 202010110498.2 dated Jan. 22, 2021.
WIPO, International Search Report and Written Opinion for International Application No. PCT/CN2020/087047, Nov. 11, 2020.
Huawei et al., Discussion on Application Descriptor, 3GPP TSG-WG SA2 Meeting #137E e-meeting, S2-2002124, Feb. 24, 2020, 5 Pages.
Motorola Mobility et al., Support of OSID and OSAppID as traffic descriptors based on stage 3 agreements, SA WG2 Meeting #137-e, 3GPP, S2-2002303, Feb. 24, 2020, 4 Pages.
First office action issued for Japanese Application No. 2022-550864 mailed on Aug. 3, 2023, 4 Pages.
Notice of allowance issued for Japanese Application No. 2022-550864 mailed on Nov. 15, 2023, 5 Pages.
Motorola Mobility et al., "Support of ATSSS rules and URSP rules for MA-PDU Sessions", SA WG2 Meeting #131, 3GPP, S2-1901732, Feb. 18, 2019, 10 Pages.
Naver Information Protection Office, Protection of bio information, which is a Physical Trait, Oct. 10, 2013, 6 Pages.
Signing Your Applications, Feb. 6, 2013, 29 Pages.
First office action issued for Korean Application No. 10-2022-4032240 mailed on Nov. 7, 2023, 10 Pages.
The extended European search report issued for European Application No. 20920320.7 mailed on Jun. 30, 2023, 8 Pages.
GlobalPlatform "GlobalPlatform Device Technology Secure Element Access Control" Version 1.1, dated Sep. 2014, 122 pages.
V.M. Joshi et al. "An Innovative Approach for Host Card Emulation" International Journal of Advanced Research in Electrical, Electronics and Instrumentation Engineering vol. 6, Issue 9, Sep. 2017, 5 pages.
Request for the Submission of an Opinion issued in corresponding KR application No. 10-2022-7032240 dated Jul. 24, 2024, 13 pages.

* cited by examiner

METHOD FOR SESSION CREATION AND RELATED EQUIPMENT

CROSS-REFERENCE TO RELATED APPLICATION(S)

This application is a National Stage of International Application No. PCT/CN2020/087047, field Apr. 26, 2020, which claims priority to Chinese Patent Application No. 202010110498.2, filed Feb. 21, 2020, the entire disclosures of which are hereby incorporated by reference.

TECHNICAL FIELD

This application relates to the field of communication technologies, and particularly to a method for session creation and related equipment.

BACKGROUND

In an existing communication system, uplink data is transmitted through session creation. Application descriptors are defined in a Traffic descriptor in a user equipment (UE) route selection policy (URSP) rule of 3rd generation partnership project (3GPP) protocol. Application descriptors can match 5G core (5GC) network configuration. However, existing application descriptors may be tampered with or forged, resulting in confusion in session creation, thereby affecting network reliability.

SUMMARY

A first aspect of implementations of the disclosure provides a method for session creation. The method for session creation is performed by a user equipment (UE) and includes: reading from a secure unit application descriptors1 of a first application, the application descriptors1 being bound to a signing certificate of the first application or a digital fingerprint of the signing certificate; and creating a session by using the application descriptors1 as application descriptors in a UE route selection policy (URSP) rule.

A second aspect of implementations of the disclosure provides a non-transitory computer-readable storage medium. The non-transitory computer-readable storage medium stores computer programs which cause a computer to: read from a secure unit application descriptors1 of a first application, the application descriptors1 being bound to a signing certificate of the first application or a digital fingerprint of the signing certificate; and create a session by using the application descriptors1 as application descriptors in a URSP rule.

A third aspect of implementations of the disclosure provides a UE. The UE includes a processor and a memory. The memory is coupled with the processor. The memory stores program codes which are operable with the processor to: read from a secure unit application descriptors1 of a first application, the application descriptors1 being bound to a signing certificate of the first application or a digital fingerprint of the signing certificate; and create a session by using the application descriptors1 as application descriptors in a URSP rule.

BRIEF DESCRIPTION OF THE DRAWINGS

In order to describe technical solutions of implementations of the disclosure more clearly, the following will give a brief description of accompanying drawings used for describing the implementations. Apparently, accompanying drawings described below are merely some implementations. Those of ordinary skill in the art can also obtain other accompanying drawings based on the accompanying drawings described below without creative efforts.

DETAILED DESCRIPTION

Hereinafter, implementations of the disclosure will be described with reference to accompanying drawings intended for the implementations.

The term "and/or" of the disclosure is merely used to describe an association relationship of associated objects, and indicates that there can be three relationships. For example, "A and/or B" means that: A alone, both A and B, or B alone. In addition, the character "/" herein generally indicates that associated objects before and after the character are in an "or" relationship.

The terms "a plurality of" or "multiple" appearing in implementations of the disclosure means two or more. The descriptions of the "first", "second", and the like appearing in implementations of the disclosure are merely used for illustration and distinguishing described objects, and do not indicate an order, nor do they indicate a special limitation on the number of devices of implementations of the disclosure, which should not constitute any limitation to implementations of the disclosure. The "connection" appearing in implementations of the disclosure refers to various connection modes such as direct connection or indirect connection, to realize communication between devices, which is not limited in implementations of the disclosure.

Figure 1:
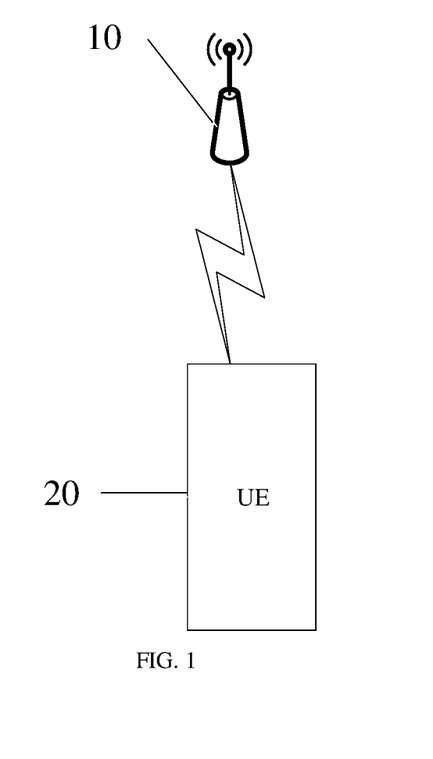
FIG. 1 is a schematic structural diagram illustrating a communication system provided in implementations of the disclosure.

Referring to FIG. 1, FIG. 1 is a schematic structural diagram illustrating a communication system provided in implementations of the disclosure. The communication system includes a base station 10 and a user equipment (UE) 20, where the base station and the UE are in wireless communication connection. The wireless communication connection includes, but is not limited to, long term evolution (LTE) connection, and new radio (NR) connection. In practice, there may also be other connection modes, and the disclosure does not limit the mode of the connection. The base station may be an eNodeB, an NR base station, or an access point (AP), etc.

The terminal in implementations of the disclosure may refer to various forms of UEs, access terminals, subscriber units, subscriber stations, mobile stations (MS), remote stations, remote terminals, and mobile equipment, user terminals, terminal equipment, wireless communication equipment, user agents, or user devices. The terminal equipment may also be a cellular telephone, a cordless telephone, a session initiation protocol (SIP) telephone, a wireless local loop (WLL) station, a personal digital assistant (PDA), a handheld device with a wireless communication function, a computing device, other processing devices coupled with a wireless modem, an in-vehicle device, a wearable device, terminal equipment in a future 5G network or a future evolved public land mobile network (PLMN), etc., which is not limited in implementations of the disclosure.

A 5G core (5GC) network requires a terminal to perform route matching and selection for uplink transmission data according to a UE route selection policy (URSP) rule distributed by a network. According to the URSP rule, an established protocol data unit (PDU) session can be multiplexed, or a new PDU session can be established. Application descriptors are defined in a Traffic descriptor of the URSP rule of 3rd generation partnership project (3GPP) protocol, and the terminal matches an uplink data route through an application identifier according to the URSP rule distributed by the network. Application identifiers in the URSP rule can be used by a network operator to provide differentiated quality of service (QoS) for different applications, thereby generating differentiated traffic control policies or payment services. The 3GPP protocol defines a URSP rule and optional application descriptors, but does not specify how to allocate and obtain an application identifier (APP ID), how an operator controls the allocated APP ID of an application to match 5GC network configuration, how a terminal obtains an APP ID of an application when evaluating and selecting a URSP rule, and how to prevent an APP ID of an application from being tampered with or forged during application distribution or application installation or in a terminal operating system.

Specifically, for 3GPP network connection, different PDU sessions are created for different applications according to different technical scenarios, and different applications may have different QoS. PDU session creation is based on application descriptors (e.g., APP ID) of an application obtained by a terminal when evaluating and selecting a URSP rule. If the application descriptors of the application are forged or tampered with, confusion in session establishment may occur, which will affect network reliability.

Figure 2:
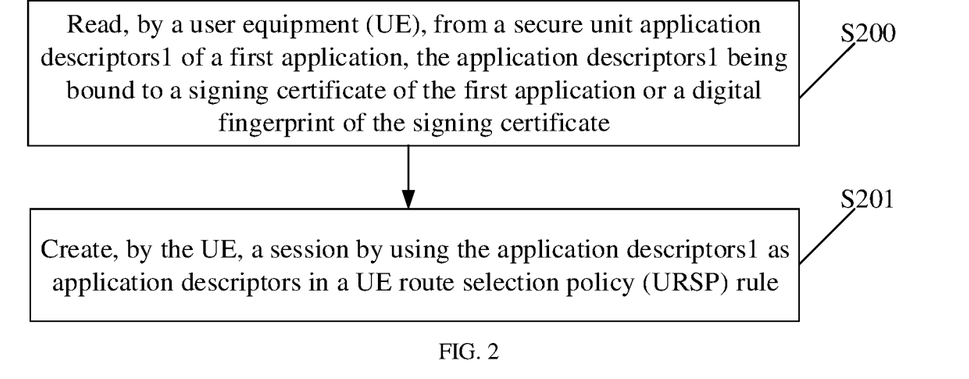
FIG. 2 illustrates a method for session creation provided in implementations of the disclosure.

Referring to FIG. 2, FIG. 2 illustrates a method for session creation provided in implementations of the disclosure. The method is performed in the communication system illustrated in FIG. 1, and the method includes, but is not limited to, the following.

At S200, UE reads from a secure unit application descriptors1 of a first application, where the application descriptors1 is bound to a signing certificate of the first application or a digital fingerprint of the signing certificate.

Specifically, in an optional implementation, the secure unit is a universal integrated circuit card (UICC), an secure element (SE) of an embedded universal integrated circuit card (eUICC), or a secure file in a subscriber identity module (SIM) card.

Specifically, in another optional implementation, the secure unit may include a signing certificate of an application or a digital fingerprint of the signing certificate. In practice, the secure unit may also include application descriptors bound to the signing certificate of the application or the digital fingerprint of the signing certificate.

Application descriptors of the disclosure may be application descriptors defined by a Traffic descriptor in 3GPP protocol.

Specifically, the application descriptors include an operating system identifier (OSId) and an operating system application identifier (OSAppId). In an optional implementation, there are multiple operating system application identifiers, which can also be represented as OSAppId(s).

At S201, the UE creates a session by using the application descriptors1 as application descriptors in a URSP rule.

Specifically, in an optional implementation, the UE uses the application descriptors1 as the application descriptors in the URSP rule for matching, and creates or multiplexes a PDU session through user route selection.

Specifically, before the operation at S200, the method further includes the following. The UE acquires the first application, where the first application contains the first application, the signing certificate of the first application, and the digital fingerprint of the signing certificate.

In an optional implementation, the UE acquires the first application locally. For example, the UE receives the first application from other devices (including but not limited to a personal computer, other UEs, etc.) in a wired or wireless manner.

In another optional implementation, the UE also acquires the first application through a network. For example, the UE transmits a request message for acquiring the first application to a network equipment, and receives an installation file or an installation package of the first application returned by the network equipment.

Specifically, the method further includes the following. The UE receives the application descriptors1 of the first application distributed by a network side, where the application descriptors1 is bound to the signing certificate of the first application or the digital fingerprint of the signing certificate, and stores into the secure unit the application descriptors1 of the first application.

In implementations of the disclosure, the digital fingerprint of the signing certificate of the first application is a string encrypted by a one-way encryption algorithm. The one-way encryption algorithm includes, but is not limited to, a hash algorithm, an SHA-1 or SHA-256 algorithm, etc.

According to technical solutions of the disclosure, the application descriptors1, which is bound to the signing certificate of the first application or the digital fingerprint of the signing certificate, is read from the secure unit when creating a session, and the application descriptors1 is configured by an operator, which can prevent the application descriptors1 from being tampered with by other applications or programs. Moreover, the application descriptors1 is stored in the secure unit, which can ensure security of the application descriptors1 and network stability. Furthermore, the technical solutions of the disclosure do not depend on hardware. A universal subscriber identity module (USIM) card is issued by the operator, and a rule for application descriptors on a UICC/eUICC can be updated uniformly by the operator through over-the-air (OTA) update. The operator can manage and control a signing certificate of an application, which can realize authorization management of the application by the operator, and provide users with differentiated value-added services and technical support. Implementation complexity of a terminal system is relatively low. The application descriptors1 is read by the terminal system from the UICC/eUICC and is applied to URSP rule selection, and an application, however, does not participate in acquisition of the application descriptors1. As such, a risk of tampering or forgery of the application descriptors1 can be eliminated at application distribution and installation stages. Before an application uses a data service, application descriptors1 with authentication guarantee can be realized without accessing a network.

Figure 3:
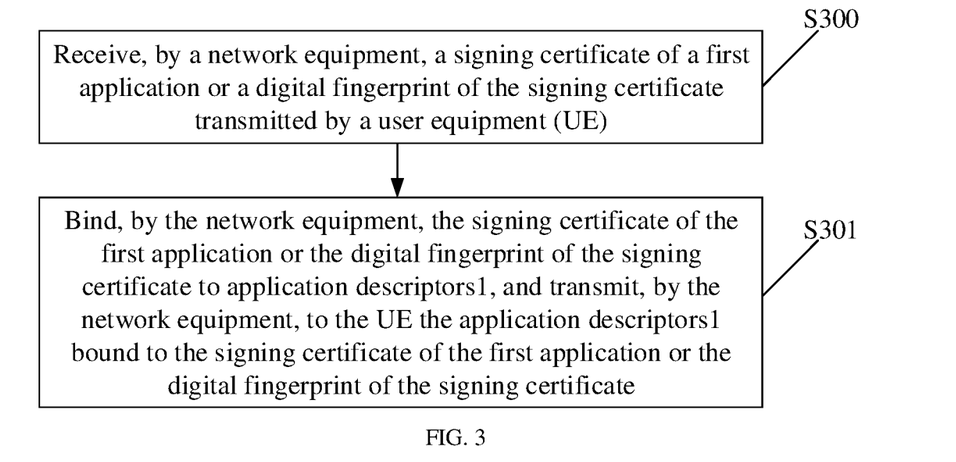
FIG. 3 illustrates a method for session communication provided in implementations of the disclosure.

Referring to FIG. 3, FIG. 3 illustrates a method for session communication. The method is implemented in the communication system illustrated in FIG. 1. The UE illustrated in FIG. 1 may be a UE of an application developer. As illustrated in FIG. 3, the method includes the following.

At S300, a network equipment receives a signing certificate of a first application or a digital fingerprint of the signing certificate transmitted by a UE;

At S301, the network equipment binds the signing certificate of the first application or the digital fingerprint of the signing certificate to application descriptors1, and transmits to the UE the application descriptors1 bound to the signing certificate of the first application or the digital fingerprint of the signing certificate.

Specifically, the application descriptors1 bound to the signing certificate of the first application or the digital fingerprint of the signing certificate is transmitted to a secure unit or a special application of the UE, where the special application is an application having an authority to change data stored in an SIM.

The special application herein may be an application provided by an operator or an application authorized by the operator.

Optionally, in an optional implementation, before the operation at S300, the method further includes the following. A network equipment receives a configuration request transmitted by an application development user, where the configuration request is for the signing certificate of the first application or the digital fingerprint of the signing certificate. The network equipment allocates to the application development user application descriptors corresponding to the signing certificate of the first application or the digital fingerprint of the signing certificate, where the signing certificate of the first application is a string encrypted by a one-way encryption algorithm.

The one-way encryption algorithm may include, but is not limited to, a hash algorithm, an SHA-1 or SHA-256 algorithm, etc.

According to the technical solution of the disclosure, an application developer is authenticated, which can support implementation of the method for session creation illustrated in FIG. 2 and improve network stability.

Figure 4:
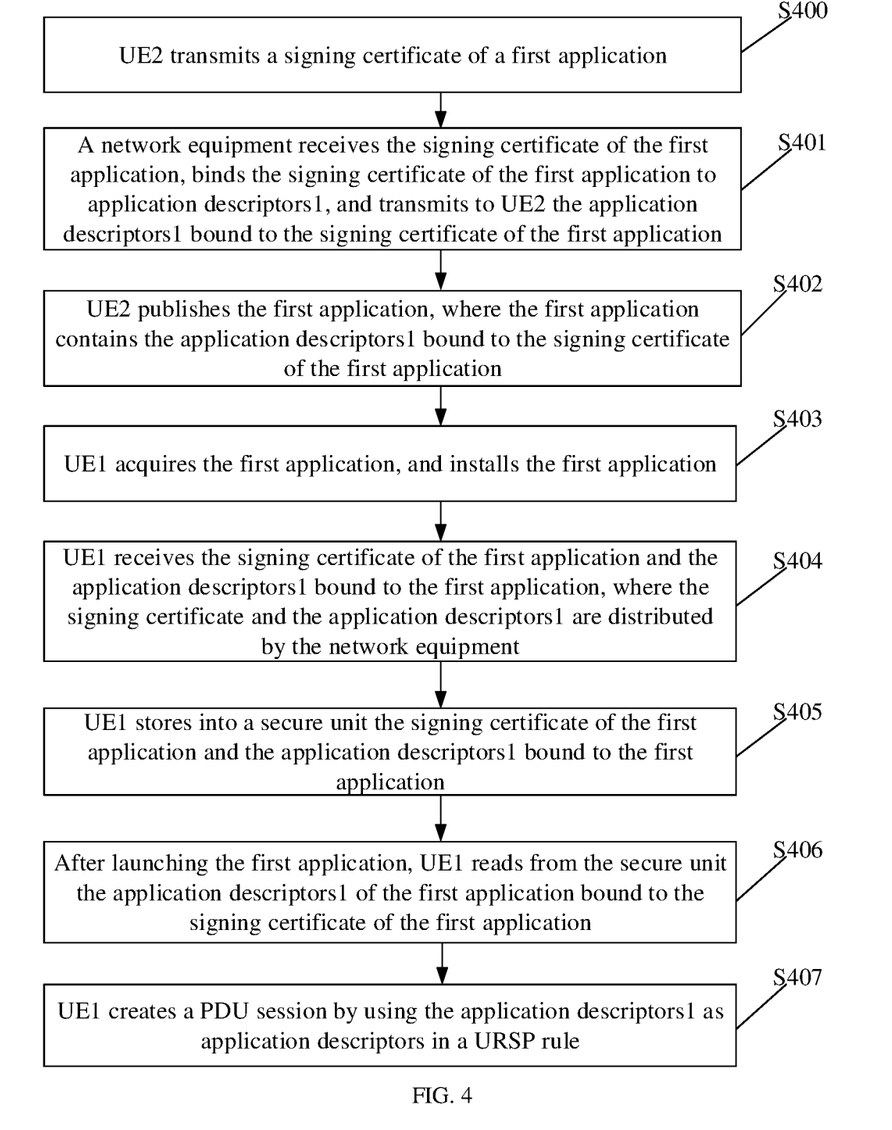
FIG. 4 illustrates a method for session creation provided in implementations of the disclosure.

Referring to FIG. 4, FIG. 4 illustrates a method for session creation provided in implementations of the disclosure. The method is implemented under a network architecture illustrated in FIG. 1. The method involves two UEs. For convenience of description, UE1 and UE2 are depicted to distinguish the two UEs, where UE1 is a UE of a user, and UE2 is a UE of an application developer. The method is depicted by taking a signing certificate of a first application as an example, referring to FIG. 4, the method provided in FIG. 4 includes the following.

At S400, UE2 transmits a signing certificate of a first application.

At S401, a network equipment receives the signing certificate of the first application, binds the signing certificate of the first application to application descriptors1, and transmits to UE2 the application descriptors1 bound to the signing certificate of the first application.

At S402, UE2 publishes the first application, where the first application contains the application descriptors1 bound to the signing certificate of the first application.

At S403, UE1 acquires the first application, and installs the first application.

At S404, UE1 receives the signing certificate of the first application and the application descriptors1 bound to the first application, where the signing certificate and the application descriptors1 are distributed by the network equipment.

At S405, UE1 stores into a secure unit the signing certificate of the first application and the application descriptors1 bound to the first application.

At S406, after launching the first application, UE1 reads from the secure unit the application descriptors1 of the first application bound to the signing certificate of the first application.

At S407, UE1 creates a PDU session by using the application descriptors1 as application descriptors in a URSP rule.

According to technical solutions of the disclosure, the application descriptors1, which is bound to the signing certificate of the first application or the digital fingerprint of the signing certificate, is read from the secure unit when creating a session, and the application descriptors1 is configured by an operator, which can prevent the application descriptors1 from being tampered with by other applications or programs. Moreover, the application descriptors1 is stored in the secure unit, which can ensure security of the application descriptors1 and network stability. Furthermore, the technical solutions of the disclosure do not depend on hardware. A USIM card is issued by the operator, and a rule for application descriptors on a UICC/eUICC can be updated uniformly by the operator through OTA update. The operator can manage and control a signing certificate of an application, which can realize authorization management of the application by the operator, and provide users with differentiated value-added services and technical support. Implementation complexity of a terminal system is relatively low. The application descriptors1 is read by the terminal system from the UICC/eUICC and is applied to URSP rule selection, and an application, however, does not participate in acquisition of the application descriptors1. As such, a risk of tampering or forgery of the application descriptors1 can be eliminated at application distribution and installation stages. Before an application uses a data service, application descriptors1 with authentication guarantee can be realized without accessing a network.

Figure 5:
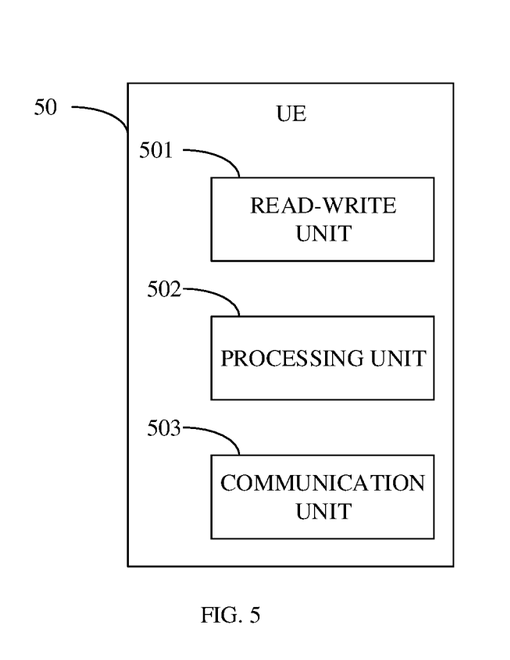
FIG. 5 is a schematic structural diagram illustrating a user equipment provided in implementations of the disclosure.

Referring to FIG. 5, FIG. 5 illustrates a UE 50. The UE includes a read-write unit 501 and a processing unit 502. The read-write unit 501 is configured to read from a secure unit application descriptors1 of a first application, where the application descriptors1 is bound to a signing certificate of the first application or a digital fingerprint of the signing certificate. The processing unit 502 is configured to create a session by using the application descriptors1 as application descriptors in a URSP rule.

Specifically, in an optional implementation, the secure unit is a UICC, an SE of an eUICC, or a secure file in an SIM card.

Specifically, in an optional implementation, the secure unit includes a signing certificate of an application or a digital fingerprint of the signing certificate, and application descriptors bound to the signing certificate of the application or the digital fingerprint of the signing certificate.

Specifically, in an optional implementation, the application descriptors are application descriptors defined by a Traffic descriptor in 3GPP protocol.

Specifically, in an optional implementation, the application descriptors include an OSId and an OSAppId.

Specifically, in an optional implementation, the processing unit is specifically configured to use the application descriptors1 as the application descriptors in the URSP rule for matching, and create or multiplex a PDU session through user route selection.

Specifically, in an optional implementation, the UE is further configured to acquire the first application, where the first application contains the first application, the signing certificate of the first application, and the digital fingerprint of the signing certificate.

Specifically, in an optional implementation, the digital fingerprint of the signing certificate of the first application is a string encrypted by a one-way encryption algorithm.

Specifically, in an optional implementation, the UE further includes a communication unit 503. The communication unit 503 is configured to receive the application descriptors1 of the first application distributed by a network side, where the application descriptors1 is bound to the signing certificate of the first application or the digital fingerprint of the signing certificate, and configured to store into the secure unit the application descriptors1 of the first application.

According to technical solutions of the disclosure, the UE reads the application descriptors1 from the secure unit when creating a session, where the application descriptors1 is bound to the signing certificate of the first application or the digital fingerprint of the signing certificate, and the application descriptors1 is configured by an operator, which can prevent the application descriptors1 from being tampered with by other applications or programs. Moreover, the application descriptors1 is stored in the secure unit, which can ensure security of the application descriptors1 and network stability. Furthermore, the technical solutions of the disclosure do not depend on hardware. A USIM card is issued by the operator, and a rule for application descriptors on a UICC/eUICC can be updated uniformly by the operator through OTA update. The operator can manage and control a signing certificate of an application, which can realize authorization management of the application by the operator, and provide users with differentiated value-added services and technical support. Implementation complexity of a terminal system is relatively low. The application descriptors1 is read by the terminal system from the UICC/eUICC and is applied to URSP rule selection, and an application, however, does not participate in acquisition of the application descriptors1. As such, a risk of tampering or forgery of the application descriptors1 can be eliminated at application distribution and installation stages. Before an application uses a data service, application descriptors1 with authentication guarantee can be realized without accessing a network.

Figure 6:
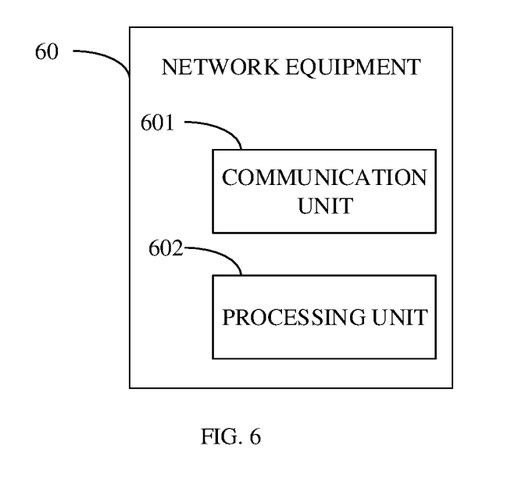
FIG. 6 is a schematic structural diagram illustrating a network equipment provided in implementations of the disclosure.

Referring to FIG. 6, FIG. 6 illustrates a network equipment 60. The network equipment includes a communication unit 601 and a processing unit 602. The communication unit 601 is configured to receive a signing certificate of a first application or a digital fingerprint of the signing certificate transmitted by a UE. The processing unit 602 is configured to bind the signing certificate of the first application or the digital fingerprint of the signing certificate to application descriptors1, and transmit to the UE the application descriptors1 bound to the signing certificate of the first application or the digital fingerprint of the signing certificate.

Specifically, in an optional implementation, the processing unit 602 is specifically configured to transmit to a secure unit or a special application of the UE the application descriptors1 bound to the signing certificate of the first application or the digital fingerprint of the signing certificate, where the special application is an application having an authority to change data stored in an SIM.

Specifically, in an optional implementation, the communication unit 601 is specifically configured to receive a configuration request transmitted by an application development user, where the configuration request is for the signing certificate of the first application or the digital fingerprint of the signing certificate. The processing unit 602 is specifically configured to allocate to the application development user application descriptors corresponding to the signing certificate of the first application or the digital fingerprint of the signing certificate, where the signing certificate of the first application is a string encrypted by a one-way encryption algorithm.

Figure 7:
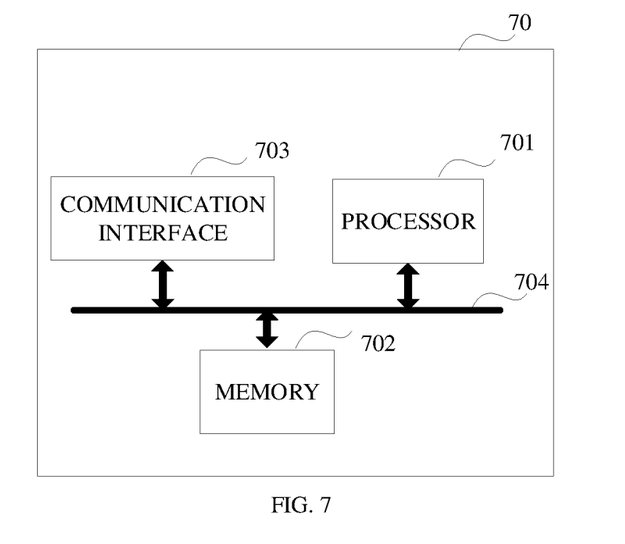
FIG. 7 is a schematic structural diagram illustrating an equipment provided in implementations of the disclosure.

Referring to FIG. 7, FIG. 7 illustrates an equipment 70 provided in implementations of the disclosure. The equipment 70 includes a processor 701, a memory 702, and a communication interface 703. The processor 701, the memory 702, and the communication interface 703 are connected to each other via a bus 704.

The memory 702 includes, but is not limited to, a random access memory (RAM), a read-only memory (ROM), an erasable programmable ROM (EPROM), or a compact disc ROM (CD-ROM), etc. The memory 702 is configured to store related computer programs and data. The communication interface 703 is configured to receive and transmit data.

The processor 701 may be one or more central processing units (CPU). If the processor 701 is a CPU, the CPU may be a single-core CPU or a multi-core CPU.

The processor 701 of the equipment 70 is configured to read computer program codes stored in the memory 702 to perform: reading from a secure unit application descriptors1 of a first application, where the application descriptors1 is bound to a signing certificate of the first application or a digital fingerprint of the signing certificate; and creating a session by using the application descriptors1 as application descriptors in a URSP rule.

It should be noted that, for details of implementation of each of the above operations, reference can also be made to corresponding descriptions of the method implementations illustrated in FIG. 2 and FIG. 4.

Implementations of the disclosure further provide a chip system. The chip system includes at least one processor, a memory, and an interface circuit. The memory, a transceiver, and the at least one processor are interconnected through a line. The memory stores computer programs which, when executed by the processor, are operable to execute method flows illustrated in FIG. 2, FIG. 3, and FIG. 4.

Implementations of the disclosure further provide a non-transitory computer-readable storage medium. The non-transitory computer-readable storage medium stores computer programs which, when run on a network equipment, are operable to execute method flows illustrated in FIG. 2, FIG. 3, and FIG. 4.

Implementations of the disclosure further provide a computer program product which, when run on a terminal, is operable to execute method flows illustrated in FIG. 2, FIG. 3, and FIG. 4.

Implementations of the disclosure further provide a terminal. The terminal includes a processor, a memory, a communication interface, and one or more programs. The one or more programs are stored in the memory and configured to be executed by the processor. The programs include instructions which are operable to execute the operations of the method of implementations illustrated in FIG. 2, FIG. 3, and FIG. 4.

The foregoing technical solutions of the implementations of the disclosure are mainly described from the viewpoint of execution of the method. It can be understood that, in order to implement the above functions, the electronic equipment includes hardware structures and/or software modules corresponding to the respective functions. Those skilled in the art should readily recognize that, in combination with the exemplary units and scheme steps or operations described in the implementations disclosed herein, the disclosure can be implemented in hardware or a combination of hardware and computer software. Whether a function is implemented by way of hardware or computer software driving hardware depends on the particular application and design constraints of the technical solution. Those skilled in the art may use different methods to implement the described functions for each particular application, but such implementation should not be considered as beyond the scope of the disclosure.

According to the implementations of the disclosure, functional units may be divided for the electronic equipment in accordance with the foregoing method examples. For example, functional units may be divided according to corresponding functions, and two or more functions may be integrated into one processing unit. The above-mentioned integrated unit can be implemented in the form of hardware or software functional units. It should be noted that the division of units in the implementations of the disclosure is schematic and is merely a logical function division; there may be other division manners in actual implementation.

Implementations of the disclosure further provide a computer storage medium. The computer storage medium stores computer programs for electronic data interchange. The computer programs cause a computer to execute all or part of the operations of any method described in the foregoing method implementations. The computer includes an electronic equipment.

Implementations of the disclosure further provide a computer program product. The computer program product includes a non-transitory computer-readable storage medium storing computer programs. The computer programs are operable with a computer to execute all or part of the operations of any method described in the foregoing method implementations. The computer program product may be a software installation package, and the computer includes an electronic equipment.

It is to be noted that, for the sake of simplicity, the foregoing method implementations are described as a series of action combinations, however, it will be appreciated by those skilled in the art that the disclosure is not limited by the sequence of actions described. That is because that, according to the disclosure, certain steps or operations may be performed in other order or simultaneously. Besides, it will be appreciated by those skilled in the art that the implementations described in the specification are exemplary implementations and the actions and modules involved are not necessarily essential to the disclosure.

In the foregoing implementations, the description of each implementation has its own emphasis. For the parts not described in detail in one implementation, reference may be made to related descriptions in other implementations.

In the implementations of the disclosure, it should be understood that, the device/equipment disclosed in implementations provided herein may be implemented in other manners. For example, the equipment implementations described above are merely illustrative; for instance, the division of the unit is only a logical function division and there can be other manners of division during actual implementations, for example, multiple units or assemblies may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the disclosure essentially, or the part of the technical solutions that contributes to the related art, or all or part of the technical solutions, may be embodied in the form of a software product which is stored in a memory and includes instructions for causing a computer device (which may be a personal computer, a server, or a network equipment and so on) to perform all or part of the operations of the method described in the various implementations of the disclosure. The memory includes various medium capable of storing program codes, such as a universal serial bus (USB), a ROM, a RAM, a removable hard disk, disk, CD, or the like.

It will be understood by those of ordinary skill in the art that all or part of the operations of various methods of the implementations described above may be accomplished by means of a program to instruct associated hardware, and the program may be stored in a computer-readable memory. The memory may include a flash memory, a ROM, a RAM, disk or CD, and so on.

Implementations of the disclosure provide a method for session creation, which can achieve effective management of application descriptors, implement session creation, and improve network reliability.

A first aspect of implementations of the disclosure provides a method for session creation. The method for session creation includes: reading, by a UE, from a secure unit application descriptors1 of a first application, the application descriptors1 being bound to a signing certificate of the first application or a digital fingerprint of the signing certificate; and creating, by the UE, a session by using the application descriptors1 as application descriptors in a URSP rule.

A second aspect of implementations of the disclosure provides a method for session communication. The method for session communication includes: receiving, by a network equipment, a signing certificate of a first application or a digital fingerprint of the signing certificate transmitted by a UE; binding, by the network equipment, the signing certificate of the first application or the digital fingerprint of the signing certificate to application descriptors1; and transmitting, by the network equipment, to the UE the application descriptors1 bound to the signing certificate of the first application or the digital fingerprint of the signing certificate.

A third aspect of implementations of the disclosure provides a terminal. The terminal includes a processor, a memory, a communication interface, and one or more programs. The one or more programs are stored in the memory and configured to be executed by the processor. The programs include instructions which are operable to execute the operations of the method of the first aspect or the operations of the method of the second aspect.

A fourth aspect of implementations of the disclosure provides a computer-readable storage medium. The computer-readable storage medium stores computer programs for electronic data interchange. The computer programs are operable with a computer to execute the method of the first aspect or the second aspect.

A fifth aspect of implementations of the disclosure provides a computer program product. The computer program product includes a non-transitory computer-readable storage medium storing computer programs. The computer programs are operable with a computer to execute all or part of the operations of the method described in the first aspect or the second aspect of implementations of the disclosure. The computer program product may be a software installation package.

By implementing technical solutions provided in implementations of the disclosure, the application descriptors1, which is bound to the signing certificate of the first application or the digital fingerprint of the signing certificate, is read from the secure unit when creating a session, and the application descriptors1 is configured by an operator, which can prevent the application descriptors1 from being tampered with by other applications or programs. Moreover, the application descriptors1 is stored in the secure unit, which can ensure security of the application descriptors1 and network stability. Furthermore, the technical solutions of the disclosure do not depend on hardware. A universal subscriber identity module (USIM) card is issued by the operator, and a rule for application descriptors on a universal integrated circuit card (UICC)/embedded UICC (eUICC) can be updated uniformly by the operator through over-the-air (OTA) update. The operator can manage and control a signing certificate of an application, which can realize authorization management of the application by the operator, and provide users with differentiated value-added services and technical support. Implementation complexity of a terminal system is relatively low. The application descriptors1 is read by the terminal system from the UICC/eUICC and is applied to URSP rule selection, and an application, however, does not participate in acquisition of the application descriptors1. As such, a risk of tampering or forgery of the application descriptors1 can be eliminated at application distribution and installation stages. Before an application uses a data service, application descriptors1 with authentication guarantee can be realized without accessing a network.

While the principles and implementations of the disclosure have been described in connection with illustrative implementations, it is to be understood that foregoing implementations are merely used to help understand the method and the core idea of the disclosure. As will occur to those skilled in the art, the disclosure is susceptible to various modifications and changes without departing from the spirit and principle of the disclosure. Therefore, contents of the Specification should not be construed as a limitation to the disclosure.

What is claimed is:

1. A method for session creation, performed by a user equipment (UE), comprising:
reading from a secure unit application descriptors1 of a first application installed in the UE, the application descriptors1 being bound to a digital fingerprint of a signature certificate of the first application, the secure unit storing a digital fingerprint of a signature certificate of an application, and application descriptors bound to the digital fingerprint of the signature certificate of the application; and
creating a session by using the application descriptors1 as application descriptors in a UE route selection policy (URSP) rule.

2. The method of claim 1, wherein the secure unit is a universal integrated circuit card (UICC), a secure element (SE) of an embedded universal integrated circuit card (eUICC), or a secure file in a subscriber identity module (SIM) card.

3. The method of claim 1, wherein the application descriptors are application descriptors defined by a Traffic descriptor in $3^{rd}$ generation partnership project (3GPP) protocol.

4. The method of claim 1, wherein the application descriptors comprise an operating system identifier (OSId) and an operating system application identifier (OSAppId).

5. The method of claim 1, wherein creating the session by using the application descriptors1 as the application descriptors in the URSP rule comprises:
using the application descriptors1 as the application descriptors in the URSP rule for matching, and creating or multiplexing a protocol data unit (PDU) session through user route selection.

6. The method of claim 1, wherein before reading from the secure unit the application descriptors1 of the first application bound to the digital fingerprint of the signature certificate of the first application, the method further comprises:
acquiring the first application, wherein the first application contains the first application, the signature certificate of the first application, and the digital fingerprint of the signature certificate.

7. The method of claim 1, wherein the digital fingerprint of the signature certificate of the first application is a string encrypted by a one-way encryption algorithm.

8. The method of claim 1, further comprising:
receiving the application descriptors1 of the first application distributed by a network side, the application descriptors1 being bound to the digital fingerprint of the signature certificate of the first application, and storing into the secure unit the application descriptors1 of the first application.

9. A non-transitory computer-readable storage medium storing computer programs which cause a computer to:
read from a secure unit application descriptors1 of a first application installed in a user equipment (UE), the application descriptors1 being bound to a digital fingerprint of a signature certificate of the first application, the secure unit storing a digital fingerprint of a signature certificate of an application, and application descriptors bound to the digital fingerprint of the signature certificate of the application; and
create a session by using the application descriptors1 as application descriptors in a UE route selection policy (URSP) rule.

10. The non-transitory computer-readable storage medium of claim 9, wherein the computer programs further cause the computer to:
receive the application descriptors1 of the first application distributed by a network side, the application descriptors1 being bound to the digital fingerprint of the signature certificate of the first application, and store into the secure unit the application descriptors1 of the first application.

11. The non-transitory computer-readable storage medium of claim 9, wherein the computer programs causing the computer to create the session by using the application descriptors1 as the application descriptors in the URSP rule cause the computer to:

use the application descriptors1 as the application descriptors in the URSP rule for matching, and create or multiplex a protocol data unit (PDU) session through user route selection.

12. The non-transitory computer-readable storage medium of claim 9, wherein the computer programs further cause the computer to:
acquire the first application before reading from the secure unit the application descriptors1 of the first application bound to the digital fingerprint of the signature certificate of the first application, wherein the first application contains the first application, the signature certificate of the first application, and the digital fingerprint of the signature certificate.

13. A user equipment (UE), comprising:
a processor; and
a memory, coupled with the processor, and storing program codes which are operable with the processor to:
read from a secure unit application descriptors1 of a first application installed in the UE, the application descriptors1 being bound to a digital fingerprint of a signature certificate of the first application, the secure unit storing a digital fingerprint of a signature certificate of an application, and application descriptors bound to the digital fingerprint of the signature certificate of the application; and
create a session by using the application descriptors1 as application descriptors in a UE route selection policy (URSP) rule.

14. The UE of claim 13, wherein the secure unit is a universal integrated circuit card (UICC), a secure element (SE) of an embedded universal integrated circuit card (eUICC), or a secure file in a subscriber identity module (SIM) card.

15. The UE of claim 13, wherein the application descriptors are application descriptors defined by a Traffic descriptor in $3^{rd}$ generation partnership project (3GPP) protocol.

16. The UE of claim 13, wherein the application descriptors comprise an operating system identifier (OSId) and an operating system application identifier (OSAppId).

17. The UE of claim 13, wherein the processor configured to create the session by using the application descriptors1 as the application descriptors in the URSP rule is configured to:
use the application descriptors1 as the application descriptors in the URSP rule for matching, and create or multiplex a protocol data unit (PDU) session through user route selection.

18. The UE of claim 13, wherein the processor is further configured to:
acquire the first application before reading from the secure unit the application descriptors1 of the first application bound to the digital fingerprint of the signature certificate of the first application, wherein the first application contains the first application, the signature certificate of the first application, and the digital fingerprint of the signature certificate.

19. The UE of claim 13, wherein the digital fingerprint of the signature certificate of the first application is a string encrypted by a one-way encryption algorithm.

20. The UE of claim 13, wherein the processor is further configured to:
receive the application descriptors1 of the first application distributed by a network side, the application descriptors1 being bound to the digital fingerprint of the signature certificate of the first application, and store into the secure unit the application descriptors1 of the first application.

* * * * *